United States Patent [19]

Cassar et al.

[11] Patent Number: 6,117,229

[45] Date of Patent: Sep. 12, 2000

[54] USE OF ORGANIC ADDITIVES FOR THE PREPARATION OF CEMENTITIOUS COMPOSITIONS WITH IMPROVED PROPERTIES OF CONSTANCY OF COLOR

[75] Inventors: Luigi Cassar, S. Donato Milanese; Carmine Pepe, Ponteranica, both of Italy

[73] Assignee: Italcement S.p.A., Bergamo, Italy

[21] Appl. No.: 09/098,567

[22] Filed: Jun. 17, 1998

[30] Foreign Application Priority Data

Jun. 19, 1997 [IT] Italy ................................ MI97A1441

[51] Int. Cl.⁷ ..................................................... C04B 24/30
[52] U.S. Cl. .......................... 106/724; 106/727; 106/728; 106/808; 106/823
[58] Field of Search .................................. 106/724, 727, 106/728, 808, 823

[56] References Cited

FOREIGN PATENT DOCUMENTS

| 0633064 | 1/1995 | European Pat. Off. . |
| 2539788 | 7/1984 | France . |
| 1222413 | of 0000 | Germany . |
| 62-53364 | 3/1987 | Japan . |
| 09075747 | 3/1997 | Japan . |
| WO9805601 | 2/1998 | WIPO . |

*Primary Examiner*—Paul Marcantoni
*Attorney, Agent, or Firm*—Hedman, Gibson & Costigan

[57] ABSTRACT

Described herein is the use of a combination of organic additives that is particularly advantageous for the preparation of cementitious compositions having a high conservation of the degree of white, which contain in mass a photocatalyst that is able to oxidize, in the presence of light, air and ambient humidity, pollutant substances present in the environment, the said photocatalyst being, in particular, titanium dioxide prevalently in the form of anatase.

The above combination of additives comprises the following: a melamine resin; a cellulose ether; a polymer chosen from among an ethylene polymer, an acrylic polymer, and a terpolymer comprising as co-monomers at least one ester of acrylic acid with an alcohol and at least one ester of vinyl alcohol with a carboxylic acid, or alternatively, an acrylic, styrene or butadiene latex; and a chemically modified starch.

17 Claims, No Drawings

6,117,229

USE OF ORGANIC ADDITIVES FOR THE PREPARATION OF CEMENTITIOUS COMPOSITIONS WITH IMPROVED PROPERTIES OF CONSTANCY OF COLOR

SCOPE OF INVENTION

The present invention regards the use of organic additives useful for the preparation of cementitious compositions having the improved property of maintaining the luminance and quantity of colour unaltered for a longer period of time after being laid or applied.

TECHNICAL PROBLEM

One of the important uses of cement (whether grey cement or white cement) is for the preparation of mortars for plasters.

Generally, plaster consists of three layers: a bottom layer, referred to as the scratch coat, which must stick to a cementitious substrate, whether compact or very porous; a second layer, referred to as the floated coat; and a third layer, referred to as the finishing coat, which must be more resistant according to the conditions of exposure.

The composition of the plaster, in particular white plaster, must meet the need to obtain, in addition to good mechanical strength and durability over time, also surfaces with good appearance, and consequently uniform as regards colour and texture.

The constancy of colour of white cement may cover, obviously within certain limits, the variations in the colour of the sand.

In actual fact, however, perhaps on account of the progressive increase in pollutants present in a typical metropolitan environment, the surface protection of these products remains resistant in big towns for increasingly shorter lengths of time, with a consequent degradation of the product from the point of view of appearance.

There is thus particularly felt the need to solve the problem of maintaining the original appearance of the surface of plasters for as long as possible.

STATE OF THE ART

The applicant previously reported in WO98/05601 filed on Jul. 24, 1997 that this problem may be effectively solved by using cementitious compositions comprising in mass particles of appropriate photocatalysts capable of oxidizing, in the presence of light, oxygen and water, the pollutant substances present in the environment.

One type of photocatalyst useful for this purpose, i.e., capable of oxidizing, in the presence of light, air and ambient humidity (oxygen and water), the pollutant substances that come into contact with the surface of the hydraulic binder (or the corresponding mortars and concretes) in the hardened state, is in particular titanium dioxide, or one of its precursors, preferably prevalently in the form of anatase, possibly doped with atoms other than Ti.

The presence of titanium dioxide and organic additives renders the application of cementitious compositions, for example plaster compositions, problematical, especially if this application is made using a roller, a brush or a paint sprayer. In addition, titanium dioxide can decompose organic additives. It is therefore by no means unimportant to choose and/or dose the organic additives that are suitable for obtaining good characteristics of film coating and texture, in particular of plasters.

SUMMARY

The applicant has now found a combination of additives that is particularly advantageous for the preparation of cementitious compositions that can ensure a high conservation of the degree of white, which contain in mass a photocatalyst that is able to oxidize, in the presence of light, air and ambient humidity, the pollutant substances present in the environment, and that enables cementitious compositions to be obtained which are particularly suitable for being applied by brush, sprayer or roller.

The essential organic additives for cementitious compositions according to the present invention are the following:

a) at least one melamine resin, obtained via condensation of melamine with formaldehyde;

b) at least one cellulose ether;

c') at least one polymer chosen from among an ethylene polymer, an acrylic polymer, and a terpolymer comprising as co-monomers at least one ester of acrylic acid with an alcohol and at least one ester of vinyl alcohol with a carboxylic acid; or alternatively to c')

c") a latex chosen from among an acrylic latex, a styrene latex, and a butadiene latex;

d) at least one chemically modified starch.

The organic additives selected according to the present invention may be mixed, at the moment of use, with the other components of the cementitious composition, or else, according to a typical embodiment of the present invention, may be in the form of a pre-formed homogeneous mixture obtained by mixing together the various organic additives, possibly pre-ground down to the desired fineness, possibly in the presence of one or more other additives and/or additional components of the cementitious composition, using conventional methods and equipment.

In this case, the mixture of organic additives according to the present invention comprises the components a), b), c') and d); or else, when the component c") is used instead of c'), the components a), b) and d) alone, in so far as c") is added to the cementitious mixture at the moment of its preparation.

Consequently, the subjects of the present invention are the following: the use of the aforesaid organic additives, in combination with one another, for the preparation of cementitious compositions comprising the above-mentioned photocatalyst; the mixture of additives a), b), c') and d) and the mixture of additives a), b) and d) as defined above, characterized in that they comprise the aforementioned photocatalyst; the dry premixes comprising the additives a), b), c') and d), or the additives a), b) and d) as defined above, characterized in that they comprise the above-mentioned photocatalyst; and the cementitious compositions containing the aforesaid photocatalyst, characterized in that they comprise the above-mentioned additives from a) to d), the cementitious products obtained from them, and the corresponding processes for their preparation.

DETAILED DESCRIPTION

In the present text, by "binder" or "hydraulic binder" is meant a pulverized material in the solid, dry state, which, when mixed with water, yields plastic mixtures that are able to set and harden, for example a cement.

By "dry premix" is meant a homogeneous mixture suitable for being mixed with water and yielding cementitious compositions (for example, mortars and concretes), comprising at least one cement binder, one or more additives for cementitious compositions, and possibly one or more inert materials.

By "cementitious composition" or "cementitious mixture" is meant a composition in which a binder is mixed with water, and possibly with aggregates of varying grain size. The cementitious compositions thus comprise both cement pastes, i.e., mixtures comprising binder and water, without aggregates, and conglomerates, i.e., mixtures comprising, water, binder and aggregates.

The "aggregates" or "inert materials" may be coarse aggregates, such as crushed stones or gravel, or fine aggregates, such as sand, and are classified in the UNI 8520 Standards.

Examples of conglomerates are mortars (mixtures comprising binder, water and fine aggregate) and concretes (mixtures comprising water, binder, fine aggregate and coarse aggregate).

The clinker used for the preparation of a binder for the present invention is any clinker of portland cement as defined in the UNI ENV 197.1 Standard, i.e., a hydraulic material made up of at least two thirds by weight of calcium silicates ($3CaO\ SiO_2$) and ($2CaO\ SiO_2$), the remaining part being $Al_2O_3$, $Fe_2O_3$ and other oxides.

In the broad definition of "hydraulic binder" according to the present invention are included both cements (white, grey or pigmented) defined according to the aforementioned standard UNI ENV 197.1, as well as the so-called "cements for debris dams", the cementitious binding materials, and hydraulic limes, as defined in the Act No. 595 of May 26, 1965.

According to the present invention, the dry premix or the cementitious compositions obtained therefrom may thus contain white, grey or pigmented cement, preferably white cement.

The particular characteristic that essentially distinguishes white cement from the other cements is precisely that of being perfectly white. The typical grey colour of ordinary portland cements derives from the presence in them of compounds of iron and other metals.

White cement is obtained from raw materials which, in the pure state, are perfectly white, and the whiteness is the demonstration of the purity of the composition of the cement.

The dry premixes according to the present invention preferably contain white cement and are characterized in that they maintain their luminance and quantity of colour for a longer period of time after being laid or applied.

In the present text, the term "in mass" indicates that the photocatalyst is added to the mass of the binder, dry premix or cementitious compositions according to the present invention, and hence is found to be distributed throughout the entire mass, i.e., also in the internal and deep layers, and not only on the surface of the present premix, or of compositions obtained therefrom.

Any type of photocatalyst capable of oxidizing, in the presence of light, oxygen and water, the pollutant substances that come into contact with the surface of the hydraulic binder in the hardened state may be used provided, of course, that it does not adversely affect the physical and mechanical characteristics of the premix and of the cementitious compositions according to the invention.

For example, photocatalysts such as cadmium sulphide (CdS) and zinc sulphide (ZnS) are not suitable, whereas tungstic oxide ($WO_3$) or strontium titanate ($SrTiO_3$), and calcium titanate, limitedly to application on grey cements, may be used.

The preferred photocatalyst according to the present invention is titanium dioxide or one of its precursors, and more typically titanium dioxide prevalently in the form of anatase.

The term "titanium dioxide prevalently in the form of anatase" means that the particles of photocatalyst present in the hydraulic binder of the present invention are particles of titanium dioxide ($TiO_2$) having the structure of anatase for at least 5% by weight, preferably 25% by weight, more preferably for at least 50% by weight, more preferably still for at least 70% by weight, with respect to the total weight of titanium dioxide. In a preferred embodiment of the invention, either $TiO_2$ P25, marketed by Degussa, was used (this is a mixture having a weight ratio of 70:30 of $TiO_2$ anatase:$TiO_2$ rutile), or else $TiO_2$ AH-R Micro produced by Tioxide, which is $TiO_2$ basically in the form of 100% anatase.

It is in fact known that $TiO_2$ crystallizes in the tetragonal forms of anatase and rutile. Rutile is the form that is more stable and more important from an industrial standpoint.

Anatase may turn into rutile even at room temperature but at an extremely slow rate.

At higher temperatures the rate of transformation is more significant. The transformation from rutile to anatase is instead impossible for $TiO_2$ crystals. Industrially these transformations are made possible owing to the orienting action of certain impurities, even though present in very small quantities.

The term "precursor of titanium dioxide" means that the preferred photocatalyst is not only limited to "$TiO_2$ prevalently in the form of anatase", but is also extended to any product which, added to the burnt clinker, hydraulic binder, premix or conglomerate, may form $TiO_2$ prevalently in the form of anatase, possibly with appropriate heat treatment.

For example, the so-called "titanium paste" may be considered a valid precursor for the titanium dioxide-based photocatalyst of the present invention.

The titanium paste ($TiO_2H_2O$) derives from the treatment of the product $TiOSO_4$ with water, and may be effectively used as a precursor of anatase without any particular heat treatment. A titanium paste that is particularly effective is sold by TIOXIDE.

The photocatalytic activity may be obtained also on $TiO_2$ matrices doped with suitable atoms, such as Fe(III), Mo(V), Ru(III), Os(III), Re(V), V(IV), and Rh(III). In particular, these atoms may substitute, at an atomic level, the Ti(IV) present in the matrix of $TiO_2$ for at least 0.5%.

The method for obtaining these photocatalysts is described in the literature, for example in J. Phys. Chem. 1994, 98, 1127–34, Angew. Chemie 1994, 1148–9, and Angew. Chemie Int., Ed. 1994, 33, 1091.

It should be pointed out that the photocatalytic action need not necessarily be fast, in that the fouling of the product by environmental pollutants takes place slowly over time. For this reason, even extremely small percentages of photocatalysts may produce a very high effect of conservation of colour over time.

By "environmental pollutant substances" are meant organic substances that may be present in the environment owing to engine exhausts or industrial emissions, such as benzene, volatile aromatic compounds, pesticides, organic aromatic compounds, benzofluorides, etc.

Not to be excluded are also inorganic compounds, such as oxides of nitrogen $NO_x$ which may be oxidized to nitrates.

The photocatalytic action of titanium dioxide is well known to the state of the art, as is also the fact that the particles of $TiO_2$ may adhere to inorganic substrates, such as cement.

What, instead, is not described is the use of titanium, or more in general of a photocatalyst, in mass, in cement or in cementitious compositions in order to maintain the quality of the surface appearance constant in terms of luminance and quantity of colour of the hardened product. By "quantity of colour" is meant the combination of characteristics of dominant wavelength and purity, as defined later. Thanks to the peculiar feature of maintaining the colour unaltered over time, a preferred aspect of the invention regards in particular the use of white cement (and of prepared cements) as hydraulic binder.

The "whiteness" of cement is defined from three standpoints:

as luminance, i.e., as power for reflecting incident light (which is the characteristic proper to white bodies as opposed to black bodies), expressed as the percentage ratio between the light reflected from a surface of white cement and the light reflected from an equivalent surface of magnesium oxide, conventionally considered as the ideal white body. In white cements produced in Italy, the value of luminance is higher than 82; in mortars produced with these cements it is a little lower;

as dominant wavelength, i.e., as tonality of the hue that accompanies and characterizes each type of white (it is precisely for this reason that white bodies are not all the same). The dominant wavelength is between yellow and blue;

as purity, i.e., as intensity of the hue. Purity is measured by the percentage of colour, which is lower than 5%.

The use of photocatalysts according to the present invention thus makes it possible to maintain these three important properties constant over time. White cement may also be pigmented to obtain an additional chromatic effect. This effect is decidedly better than the one obtainable, given the same conditions, with grey cement. It is interesting to note that white cement, given its chemical composition, does not alter either the tone or the luminosity of the colouring obtained with the pigment (alterations which, instead, are inevitable with grey cement).

The pigment must be mixed thoroughly in the mixture or, separately, with the cement. The percentage of pigment to be added must be sought on a case-by-case basis according to the desired chromatic effect. This percentage is with respect to the weight of cement (for example, if iron-oxide based mineral pigments are used, the above percentage is around 2% with respect to the weight of the cement).

In general, the pigments used are:

colouring agents with an inorganic base, such as: natural colouring agents (yellow ochre, iron oxide-based reds, such as red ochre, English red, Spanish red; umber; ultramarine, etc.); or mineral colouring agents (yellow zinc chromate; Schweinfurt green; Berlin blue; Bremen blue; lead-based colouring agents, such as Naples yellow; chrome yellow; the group of iron oxide-based mineral colouring agents, having a chromatic range from brown to orange and to yellow).

The additives useful for the present invention are chosen from among those known in the cement field.

The mixture of organic additives of the present invention is in particular suitable for the preparation of mortars containing the aforesaid photocatalyst, more in particular mortars for plasters, such as hydraulic limes, or, more in general, cementitious levellers, i.e. plasters for levelling uneven surfaces, suitable for protecting the surfaces of concretes.

Particularly preferred cementitious compositions according to the present invention are mortars containing the above-mentioned photocatalyst, which are used for the preparation of plasters for finishing coats, and the said plasters. According to the type of cementitious composition that is to be prepared and the characteristics desired, in combination with the organic additives a), b), c') or c"), and d), it is possible to use also one or more of the following additives for cementitious compositions:

e) at least one anionic surfactant;

f) at least one polysaccharide;

g) at least one anti-foaming agent;

h) at least one fibre chosen from among organic or inorganic fibres.

The modified starch d), the surfactant e), and the anti-foaming agent g) have in particular the function of improving the sprayability of the cementitious compositions. The polysaccharide of improves the workability, using a puffy knife, of the cementitious compositions.

The component a) is a superfluidifier: this enables reduction of the water/cement ratio and improves the impermeability and resistance of the cementitious compositions thus obtained. A superfluidifier that is suitable for the purposes of the present invention is, for example, Melment F10 marketed by SKW-Trostberg.

The component b) is an agent that regulates the viscosity in the mixing water: it improves the water retention of the mixture and the adherence of the cementitious composition to the substrate to which it is applied.

The component b) is for example a cellulose ether having etherified hydroxyl groups (alkylates) with $C_1$–$C_6$ alkyl or hydroxyalkyl residues, such as hydroxypropylmethylcellulose, hydroxypropylcellulose, hydroxyethylcellulose, methylcellulose, and more in particular hydroxypropylmethylcellulose, for example that marketed by Dow Chemicals under the name Methocell 228.

The cellulose ether has, for example, a viscosity of between 4,000 and 15,000 cp (at 25° C.).

($C_x$–$C_y$, where x and y are integers, indicates, in accordance with convention, an interval of numbers of carbon atoms).

The component c') or c") is a plasticizer: this improves adherence, elasticity, stability and impermeability of the cementitious compositions containing it, and also favours formation of flexible films.

The component c') is in general a polymeric powder that can be re-dispersed in water; for example, a terpolymer comprising as co-monomers at least one ester of acrylic acid with a $C_1$–$C_6$ alcohol and at least one ester of vinylic alcohol with a $C_1$–$C_{12}$ carboxylic acid, such as acetic acid (vinyl acetate) and versatic acid (vinyl versatate).

Under the common name "versatic acid" are indicated various trialkylacetic acids having, for example, from 4 to 12 carbon atoms; for example, trimethylacetic acid, 2,2-dimethylpropanoic acid (pivalic acid or neopentanoic acid), neodecanoic acid, having 10 carbon atoms, all these acids being either used alone or mixed together, and also used as mixtures of isomers (cf. Encyclopedia of Chemical Technology, KIRK-OTHMER, John Wiley & Sons, 3rd Ed., 1981, Vol. 4, pp. 863–864).

The additive c') is, for example, the butyl acrylate-vinyl acetate-vinyl versatate terpolymer, marketed by Aqualon under the name Elotex AP 200.

Alternatively, the component c') may be replaced by one of the latexes listed above as component c"), which is not premixed with the other organic additives or with the other components of the dry premix, but added to the cementitious composition at the moment of mixing its components with water.

The additive d) is a thickener: this improves, in particular, the resistance to sagging of the cementitious compositions containing it.

The additive d) is for example an etherified starch, having hydroxyl groups alkylated with $C_1$–$C_6$ alkyl or hydroxyalkyl residues, for example 2-hydroxypropyl ether of starch, for example the one marketed by Aqualon under the name Amylotex 8100.

The component e) is an air-entraining agent: this improves workability and resistance of the cementitious compositions to freezing/thawing.

The component e) is, for example, a sulphuric ester of higher alcohols, for example $C_{12}$–$C_{16}$ ones, such as sodium lauryl sulphate (for example the product marketed by Aqualon under the name Silipon RN 6031).

The component f) is an agent having thixotropic activity: this improves segregation and surface finishing of the present cementitious compositions.

The component f) is, for example, a polysaccharide, such as alginic acid, cellulose, and corresponding salts (e.g., sodium salt) or esters with carboxylic acids, or a rubber. The component f) may, for instance, be the commercial product KELCO-CRETE K1C 376 manufactured by Monsanto.

The component g) is an anti-foaming agent: this controls the quantity of air bubbles included in the cementitious compositions containing it. The component used, for example, may be the product marketed under the name NOPCO PD1 by NOPCO Italiana.

The component h) is, for example, chosen from among organic fibres, such as polyvinyl alcohol fibres and polyethylene fibres, or from among inorganic fibres, such as carbon fibres or wollastonite fibres.

The quantity of photocatalyst in the present cementitious compositions is not critical, it being, however, desirable to use small quantities for reasons of costs. Preferably, the mixtures of additives, the dry premixes and the cementitious compositions according to the present invention contain a photocatalyst (preferably titanium dioxide prevalently in the form of anatase) in a proportion of from 0.1% by weight to 10% by weight, more in particular from 0.3% by weight to 3% by weight, for example around 1.5% by weight, the said weight percentage being with respect to the total weight of the inorganic components in the dry state of the dry premix or of the cementitious composition, where the inorganic components comprise at least one hydraulic binder (for example, a cement) and at least one photocatalyst, possibly at least one inert aggregate, and possibly also an inorganic filling material.

By "dry state" is meant the degree of humidity substantially corresponding to that of the materials as they are sold.

Preferably, the organic additives selected according to the present invention are used in the following weight percentages, with respect to 100 parts by weight of inorganic components of the premixes or of the cementitious compositions of the present invention in the dry state:

a) from 0.35% by weight to 1% by weight, more preferably approximately 0.5% by weight;

b) from 0.1% by weight to 0.3% by weight, more preferably approximately 0.15% by weight;

c') or c") from 1% by weight to 5% by weight, more preferably approximately 3% by weight;

d) from 0.005% by weight to 0.02% by weight, more preferably approximately 0.01% by weight;

and, in addition, when present:

e) from 0.02% by weight to 0.04% by weight, more preferably approximately 0.02% by weight;

f) from 0.01% by weight to 0.04% by weight, more preferably approximately 0.02% by weight;

g) from 0.1% by weight to 0.5% by weight, more preferably approximately 0.2% by weight;

h) from 0.1% by weight to 3% by weight of organic fibres, or else up to 10% by weight of inorganic fibres.

The dry premixes according to the present invention thus comprise at least one hydraulic binder (for example, a cement), the aforementioned photocatalyst, and moreover the combination of organic additives a), b), c') and d), or else the combination of organic additives a), b) and d) as specified above, and possibly also one or more additives chosen from among e), f) and g), and possibly h).

According to typical embodiments of the present invention, the dry premix contains the following inorganic components: at least one hydraulic binder (typically a cement), at least one inert aggregate, at least one inorganic filler, and the above-mentioned photocatalyst. The preferred types and quantities of hydraulic binder, inert aggregate and inorganic filler are as specified below for the cementitious compositions.

The cementitious compositions of the present invention are characterized in that they contain the aforementioned photocatalyst, as well as the additives a), b), c') or c") and d) as specified above, and possibly also one or more additives e), f) and g), and possibly h), as specified above.

Preferred cementitious compositions of the present invention, particularly suitable for the preparation of plasters, comprise, in addition to the above-mentioned photocatalyst, the following inorganic materials: at least one hydraulic binder (typically a cement), at least one inert aggregate, and at least one inorganic filler. The dry premixes and cementitious compositions according to the present invention contain, for example, the following weight percentages of inorganic components, with respect to the total weight of the inorganic components in the dry state:

hydraulic binder (typically cement): from 30% by weight to 55% by weight, more preferably approximately 35% by weight;

inert aggregate (typically sand): from 30% by weight to 70% by weight, more preferably approximately 60% by weight;

filler: from 1% by weight to 6% by weight, more preferably approximately 3.5% by weight;

photocatalyst (preferably titanium dioxide): preferably in quantities of from 0.3% by weight to 3% by weight, typically approximately 1.5% by weight.

The hydraulic binder is typically a cement, preferably a white cement.

For example, type-I white cement may be used (such as white cement of type I-52, 5 R), more in particular in quantities of from 30% by weight to 40% by weight, more preferably approximately 35% by weight, with respect to the total weight of the inorganic components in the dry state, or type-II white cement (such as type II-B-L), in particular in quantities of from 40% by weight to 55% by weight, with respect to the total weight of the inorganic components in the dry state.

The inert aggregate is typically sand, either siliceous or calcareous sand, having, for example, particles of up to approximately 150 $\mu$m.

The inorganic filling material, also referred to as filler, bestows on the cementitious compositions containing it increased resistance, lower porosity and reduced laitance.

The inorganic filler is, for example, chosen from among metakaolin ($Al_2O_3$ $SiO_2$) and $SiO_2$ and their mixtures, preferably one of their mixtures.

In typical compositions according to the present invention, as previously described, the titanium dioxide is preferably chosen from between a mixture of $TiO_2$ anatase and $TiO_2$ rutile in a weight ratio of 70:30, and $TiO_2$ essentially 100% in the form of anatase.

Typical cementitious compositions, dry premixes and mixtures of additives according to the present invention have the compositions specified later in Examples 1 and 2.

Cementitious compositions of the invention are in particular mortars having binder/aggregate weight ratios of between 2:1 and 1:1 or concretes having binder/aggregate weight ratios of between 1:3 and 1:6.

The quantity of water used in the cementitious compositions is that sufficient for completing the hydration reaction of the binder and for bestowing optimal workability on the mixture in the plastic state. The proportions between water, binder and possible aggregates of the cementitious compositions may vary within a wide range and depend upon the desired properties and final uses of the mortars and concretes. In general, the quantity of water is between 20% by weight and 60% by weight with respect to the weight of the binder.

The method for preparing the mixture may be any conventional method. The temperature at which the water is mixed with the binder and possible aggregates is generally between +5° C. and +30° C., and is preferably at least +20° C.

The way in which the photocatalyst is added is not an essential characteristic of the invention; the photocatalyst may be simply added to the powder of the hydraulic binder or to the components of the mixture of additives, of the premix or of the cementitious compositions, and mixed according to any one of the methods known to the state of the art, either using an automatic mixer or manually.

The fact that the photocatalyst may be added in such a simple way makes the use of premixes particularly preferred for the implementation of the present invention. It should be pointed out that an exhaustive exemplification of the invention may be carried out only through very long procedures (in the order of years), in so far as the correct evaluation of the maintenance of the characteristics of the hardened binders, in particular architectural concretes, involve procedures of natural "ageing" in the actual micro-climate.

The invention so far described will now be illustrated in a few examples, which in no way should be considered as limiting the scope of the invention.

EXAMPLE 1

Formulation with a cementitious base having a high conservation of the degree of white Application: roller or brush Thickness of application: <1 mm

| Dry mixture | | 1 | 2 | Optimal |
|---|---|---|---|---|
| Inorganic materials | | | | |
| White cement Type I-52, 5R | % | 30 to 40 | // | 35 |
| White cement Type II/B-L | % | // | 40 to 55 | // |
| Siliceous or calcareous sand (0 to 150 micron) | % | 67 to 52 | 58 to 37 | 60 |
| Mineral filler | % | 2 to 6 | 1 to 5 | 3.5 |
| Titanium dioxide | % | 0.3 to 2 | 0.4 to 3 | 1.5 |
| Organic materials | | | | |
| a) Melment F 10 | % (on dry) | 0.35 to 1.0 | 0.35 to 1.0 | 0.50 |
| b) Methocell 228 | " | 0.1 to 0.3 | 0.1 to 0.3 | 0.15 |
| c) Elotex AP 200 | " | 1 to 5 | 1 to 5 | 3 |
| d) Amylotex 8100 | " | 0.005 to 0.02 | 0.005 to 0.02 | 0.01 |
| e) Silipon RN 6031 | " | 0.02 to 0.04 | 0.02 to 0.04 | 0.02 |

The quantities of inorganic materials are weight percentages with respect to the total weight of the inorganic materials in the dry state. The quantities of the organic materials are weight percentages out of 100 parts by weight of the inorganic materials in the dry state.

EXAMPLE 2

Formulation with a cementitious base having a high conservation of the degree of white Application: spray or metal puffy knife Thickness of application: 0.5 to 2 mm

| Dry mixture | | 1 | 2 | Optimal |
|---|---|---|---|---|
| Inorganic materials | | | | |
| White cement Type I-52, 5R | % | 30 to 40 | // | 35 |
| White cement Type II/B-L | % | // | 40 to 55 | // |
| Siliceous or calcareous sand (0 to 150 micron) | % | 67 to 52 | 58 to 37 | 60 |
| Mineral filler | % | 2 to 6 | 1 to 5 | 3.5 |
| Titanium dioxide | % | 0.3 to 2 | 0.4 to 3 | 1.5 |
| Organic materials | | | | |
| a) Melment F 10 | % (on dry) | 0.35 to 1.0 | 0.35 to 1.0 | 0.50 |
| b) Methocell 228 | " | 0.1 to 0.3 | 0.1 to 0.3 | 0.15 |
| c) Elotex AP 200 | " | 1 to 5 | 1 to 5 | 3 |
| d) Amylotex 8100 | " | 0.005 to 0.02 | 0.005 to 0.02 | 0.01 |
| *e) Silipon RN 6031 | " | 0.02 to 0.04 | 0.02 to 0.04 | 0.02 |
| *f) Keco-crete K | " | 0.01 to 0.04 | 0.01 to 0.04 | 0.02 |
| *g) Nopco PD1 | " | 0.1 to 0.5 | 0.1 to 0.5 | 0.2 |

The quantities of inorganic materials are weight percentages with respect to the total weight of the inorganic materials in the dry state. The quantities of the organic materials are weight percentages with respect to 100 parts by weight of the inorganic materials in the dry state.

The introduction of these materials depends on the type of surface finishing desired and on the application technique adopted.

EXAMPLE 3

Substrates were prepared having the shape of disks (diameter, 3.2 cm; thickness, 7 mm) using ordinary cementitious mortar having a base of Italbianco Italcementi 52.5.R white cement.

After preparation, the test specimens were cured for 1 day in moulds at a temperature of 20° C. and relative humidity (RH) >90%; after ejection, the test specimens were kept for a further 7 days at a temperature of 20° C. and RH of approx. 60%.

These test specimens were then used as substrates for the applications of a cementitious mortar to which titanium dioxide had been added, having the composition specified in Example 1 (optimal values).

Two specimens of white cement mortar were prepared.

The two specimens contained 1.5% by weight of TiO$_2$, of the type P-25 DEGUSSA (specimen A) and AH-R TIOXIDE (specimen B).

For purposes of comparison, a third specimen without TiO$_2$ was prepared (specimen C).

Each composition was vigorously mixed for 5 minutes using a high-speed stirrer until a fluid consistency was obtained. Next, the compositions were applied, using a roller or a brush, on the substrates previously described. At the end of the application, the mean thickness of the mortar was found to be <1 mm.

The test specimens thus prepared were then cured for 7 days at a temperature of 20° C. and RH of ~60%.

In order to obtain reproducible and homogeneous surface quantities of organic substance, a solution obtained from extraction with alcoholic solvent of tobacco was deposited, on the specimens, using a spray gun. The quantity deposited on the specimens was 1.5 mg/cm$^2$.

At the end of the above-mentioned treatment, each specimen presented a surface of an even, yellow colour.

Both before and after the application of the organic substance on the test specimens, reflectance spectrophotometric analyses were performed using a Perkin Elmer spectrophotometer, Model Lambda 6, equipped with an integrating sphere to eliminate diffused light (which is the cause of the anisotropy and irregularity of the surfaces).

The specimens were irradiated by means of a solar flux simulator (this simulates the solar spectrum), which emits radiations having a wavelength of above 290 nm.

The apparatus used for irradiation consisted of four 400-Watt HANAU lamps located at the vertices of a square, at the centre of which was located a specimen carousel rotating about its own axis. Using this apparatus, it was possible to irradiate a number of specimens simultaneously and to ensure that each specimen should obtain the same quantity of photons per photon flux.

The irradiation apparatus thus makes it possible to perform tests of accelerated ageing, where, as an approximation, 100 days of irradiation correspond to one year of sunlight.

For each specimen, spectra of percentage reflectance (R%) according to the wavelength (nm) were acquired at different times.

The data confirming the activity of these catalysts are tabulated in Table 1, which gives the values of the percentage reflectance (R%) for the wavelength of 450 nm as a function of time. The values were then normalized to take into account the different indices of refraction of the specimens. The values given are indicated with residual Q%.

The reflectance R is obtained from the ratio between the light reflected from a surface and the light incident on the same surface.

The normalization coefficient $N_t$ is defined as follows:

$$N_t = [R_{t0} - R_t]/R_{t0}$$

where $R_{t0}$ is the reflectance of the specimen at time zero, before the application of the cigarette extract, and $R_t$ is the reflectance measured at a given time t after application of the cigarette extract.

The normalization coefficient thus determined makes it possible to calculate the residual Q%, so enabling a comparison between different materials with different intrinsic reflectance.

As may be noted in Table 1, the specimens containing titanium dioxide achieve increasingly lower normalized values over time, this being an index of the activity of the photocatalyst. The analytical datum emerges also from the visual standpoint; in the specimens containing TiO$_2$, in fact, the yellow colouring due to the cigarette extract was seen to disappear completely.

Although also the values regarding the specimen C (i.e., the specimen without TiO$_2$) decrease over time, albeit to a significantly lower extent than in the specimens containing TiO$_2$, from a visual standpoint it is possible to note clear isolated areas of a yellow colour on the surface of the said specimen.

In Table 1 it may also be noted how the process works with different types of titanium dioxide, prevalently in the form of anatase.

TABLE 1

DATA FOR CIGARETTE EXTRACT

| Time (h) | R % (450 nm) | Normalization | Residual Q % |
|---|---|---|---|
| P-25 Specimen A | | | |
| 0 | 66.80 | — | — |
| 0 + cig. extr. | 52.70 | 0.21 | 100 |
| 2 | 58.50 | 0.12 | 59.1 |
| 4 | 59.90 | 0.10 | 49.1 |
| 7 | 63.40 | 0.05 | 23.8 |
| 11 | 65.50 | 0.02 | 9.5 |
| A-HR Specimen B | | | |
| 0 | 70.30 | — | — |
| 0 + cig. extr. | 53.20 | 0.24 | 100 |
| 2 | 60.40 | 0.14 | 58.3 |
| 4 | 62.40 | 0.11 | 45.8 |
| 7 | 65.80 | 0.06 | 26.7 |
| 11 | 67.90 | 0.03 | 14.2 |
| Specimen C (without TiO$_2$) | | | |
| 0 | 67.20 | — | — |
| 0 + Cig. extr. | 50.20 | 0.25 | 100 |
| 2 | 54.60 | 0.19 | 76 |
| 4 | 56.20 | 0.16 | 64 |
| 7 | 58.80 | 0.12 | 50 |
| 11 | 61.20 | 0.09 | 36 |

"Cig. extr." stands for "cigarette extract"

What is claimed is:

1. A dry premix comprising the following inorganic materials: at least one hydraulic binder, at least one inert aggregate, at least one inorganic filler, and at least one photocatalyst that oxidizes in the presence of light, air and ambient humidity the pollutant substances present in the environment, said dry premix comprising the combination of organic additives:
   a) at least one melamine resin obtained from condensation of melamine with formaldehyde;
   b) at least one cellulose ether;
   c') at least one polymer selected from the group consisting of: an ethylene polymer, an acrylic polymer, and a terpolymer comprising as co-monomers at least one ester of acrylic acid with an alcohol and at least one ester of vinyl alcohol with a carboxylic acid;
   d) at least one chemically modified starch;
   or the combination of organic additives a), b) and d), wherein said organic additives are present in the followings weight percentages, with respect to 100 parts by weight of inorganic components of the dry premix in the dry state:
   a) from 0.35% by weight to 1% by weight; b) from 0.1% by weight to 0.3% by weight; c') from 1% by weight to 5% by weight; d) from 0.005% by weight to 0.02% by weight.

2. A premix according to claim 1, further comprising one or more of the following additives:

anionic surfactant;

polysaccharide;

anti-foaming agent; and;

one fibre selected from the group consisting of organic or inorganic fibers.

3. A remix according to claim 1, comprising, in addition to the aforementioned photocatalyst, also the following inorganic materials: at least one hydraulic binder, at least one inert aggregate, and at least one inorganic filler.

4. A premix according to claim 1, comprising the following weight percentages of inorganic components with respect to the total weight of the inorganic components in the dry state:

hydraulic binder: from 30% by weight to 55% by weight;

inert aggregate: from 30% by weight to 70% by weight;

filler: from 1% by weight to 6% by weight;

photocatalyst: from 0.3% by weight to 3% by weight.

5. A premix according to claim 4, comprising the following weight percentages of inorganic components:

hydraulic binder: 35% by weight;

inert aggregate: 60% by weight;

filler: 3.5% by weight;

photocatalyst: 1.5% by weight.

6. A premix according to claim 4, where the binder is a cement; the aggregate is sand, the filler is selected from the group consisting of: metakaolin, $SiO_2$ and their mixtures; and the photocatalyst is titanium dioxide predominantly in the form of anatase.

7. A premix according to claim 4, in which the binder is a white cement; the aggregate is siliceous or calcareous sand having particles of up to 150 $\mu$m; the filler is a mixture of metakaolin and $SiO_2$; and the photocatalyst is a mixture selected from the group consisting of $TiO_2$ anatase and $TiO_2$ rutile in a weight ratio of 70:30, and $TiO_2$ approximately 100% in the form of anatase.

8. A cementitious composition comprising water and the following inorganic materials: at least one hydraulic binder, at least one inert aggregate, at least, one inorganic filler and a least one photocatalyst that oxidizes in the presence of light, air and ambient humidity the pollutant substances present in the environment, said cementitious composition comprising the combination of organic additives:

a) at least one melamine resin, obtained from condensation of melamine with formaldehyde;

b) at least one cellulose ether;

c') at least one polymer selected from the group consisting of: an ethylene polymer, an acrylic polymer, and a terpolymer comprising as co-monomers at least one ester of acrylic acid with an alcohol and at least one ester of vinyl alcohol with a carboxylic acid; or alternatively to the component c'):

c") at least one latex selected from the group consisting of: an acrylic latex, a styrene latex, and a butadiene latex;

d) at least one chemically modified starch;

wherein said organic additives are present in the following weight percentages of inorganic components, with respect to the total weight of the inorganic components in the dry state:

a) from 35% by weight to 1% by weight b) from 0.1% by weight to 0.3% by weight; c') or c") from 1% by weight to 5% by weight; d) from 0.005% by weight to 0.02% by weight.

9. A cementitious composition according to claim 8, further comprising one or more of the following additives:

anionic surfactant;

polysaccharide;

anti-forming agent; and one fibre selected from the group consisting of organic or inorganic fibers.

10. A cementitious composition according to claim 8, comprising, in addition to the above-mentioned photocatalyst, also the following inorganic materials: at least one hydraulic binder, at least one inert aggregate, and at least one inorganic filler.

11. A cementitious composition according to claim 8, comprising the following weight percentages of inorganic components, with respect to the total weight of the inorganic components in the dry state:

hydraulic binder: from 30% by weight to 55% by weight;

inert aggregate: from 30% by weight to 70% by weight;

filler: from 1% by weight to 6% by weight;

photocatalyst: from 0.3% by weight to 3% by weight.

12. A cementitious composition according to claim 11, comprising the following weight percentages of inorganic components:

hydraulic binder: 35% by weight;

inert aggregate: 60% by weight;

filler: 3.5% by weight;

photocatalyst: 1.5% by weight.

13. A cementitious composition according to claim 11, where the binder is a cement; the aggregate is sand; the filler is selected from the group consisting of: metakaolin, $SiO_2$ and their mixtures; the photocatalyst is titanium dioxide predominantly in the form of anatase.

14. A cementitious composition according to claim 11, in which the binder is a white cement, the aggregate is siliceous or calcareous sand having particles of up to 150 $\mu$m; the filler is a mixture of metakaolin and $SiO_2$ and the photocatalyst is selected from the group consisting of a mixture of $TiO_2$ anatase and $TiO_2$ rutile in a weight ratio of 70:30 and $TiO_2$ approximately 100% in the form of anatase.

15. A cementitious composition according to claim 8, which is a mortar for plaster for finishing coats.

16. A cementitious product obtained from a composition as defined in claim 8.

17. A cementitious product according to claim 16 which is a plaster for finishing coats.

* * * * *